(12) United States Patent
Kuhlman et al.

(10) Patent No.: US 8,364,120 B2
(45) Date of Patent: Jan. 29, 2013

(54) IDENTITY VERIFICATION USING LOCATION OVER TIME INFORMATION

(75) Inventors: Douglas A. Kuhlman, Barrington, IL (US); Yi Q. Li, Skokie, IL (US); Larry C. Puhl, Huntley, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1356 days.

(21) Appl. No.: 11/461,922

(22) Filed: Aug. 2, 2006

(65) Prior Publication Data

US 2008/0033637 A1    Feb. 7, 2008

(51) Int. Cl.
*H04M 1/66* (2006.01)
*H04W 24/00* (2009.01)

(52) U.S. Cl. ............... 455/411; 455/410; 455/456.1; 455/456.6

(58) Field of Classification Search .......... 455/410–411, 455/456.1–456.6, 556.1–558
See application file for complete search history.

(56) References Cited

U.S. PATENT DOCUMENTS

| | | | | |
|---|---|---|---|---|
| 5,535,431 A * | 7/1996 | Grube et al. | ............ | 455/411 |
| 5,940,751 A * | 8/1999 | Kaplan et al. | ............ | 455/411 |
| 6,845,239 B1 * | 1/2005 | Sato et al. | ............ | 455/456.1 |
| 6,928,292 B2 * | 8/2005 | Tsunehara et al. | ...... | 455/456.1 |
| 6,980,812 B1 * | 12/2005 | Sandhu et al. | ........ | 455/456.1 |
| 7,016,689 B2 * | 3/2006 | Clark et al. | ............ | 455/456.1 |
| 2002/0142799 A1 * | 10/2002 | Chu-Chia et al. | ........ | 455/556 |
| 2002/0177449 A1 * | 11/2002 | McDonnell et al. | ....... | 455/456 |
| 2003/0045270 A1 * | 3/2003 | Agrawal et al. | ........ | 455/410 |
| 2003/0158960 A1 | 8/2003 | Engberg | | |
| 2003/0236818 A1 | 12/2003 | Bruner et al. | | |
| 2004/0088587 A1 | 5/2004 | Ramaswamy et al. | | |
| 2004/0102896 A1 * | 5/2004 | Thayer et al. | ............ | 701/207 |
| 2004/0176103 A1 | 9/2004 | Trossen et al. | | |
| 2004/0243856 A1 | 12/2004 | Shatford | | |
| 2004/0255081 A1 | 12/2004 | Arnouse | | |
| 2004/0260766 A1 | 12/2004 | Barros et al. | | |
| 2006/0135179 A1 * | 6/2006 | Aaltonen | ........... | 455/456.3 |

FOREIGN PATENT DOCUMENTS

| | | |
|---|---|---|
| EP | 1510785 A | 3/2005 |
| WO | 03036919 A | 5/2003 |
| WO | 03056865 A | 7/2003 |

OTHER PUBLICATIONS

Hewlett-Packard Website, "ProCurve Networking Access Control Security Solution technical brief," Hewlett-Packard Development Company, LP, 2006, 8 pages.

(Continued)

*Primary Examiner* — George Eng
*Assistant Examiner* — Nam Huynh
(74) *Attorney, Agent, or Firm* — Sylvia Chen; Leveque Intellectual Property Law, P.C.

(57) ABSTRACT

The identity of a user of a mobile device is verified by the mobile device accessing the location of the mobile device over recent time to obtain a current route, comparing a feature of the current route to characteristic features of previous routes stored on the mobile device. The user is verified if the feature of the current route matches a characteristic feature of previous routes. The previous routes may be obtained by tracking the location of the mobile device over time to obtain a number of routes, identifying characteristic features of the routes, and storing the characteristic features of the routes.

20 Claims, 3 Drawing Sheets

OTHER PUBLICATIONS

Andreas M. Antonopoulos, "Location and Presence Take Identity Management to Next Level", Network World, http://www.networkworld.com/newsletters/datacenter/2004/1004datacenter1.html, Oct. 4, 2004, 2 pages.

Kevin L. Sally, "Develop a Location-Based Service Application Using JSR 179", IBM developerWorks, http://www.ibm.com/developerworks/java/tutorials/wi-mobilesa/wi-mobilesa-pdf.pdf, Oct. 10, 2006, 49 pages.

Bruce Arnold, "Casion Analytics Privacy Guide", Caslon Analytics, http://www.caslon.com.au/privacyguide19.htm, May 2008, 6 pages.

J. Cuellar et al., "Geopriv Requirements", Internet Engineering Task Force (IETF) Network Working Group Request for Comments 3693, http://tools.ietf.org/pdf/rfc3693.pdf, Feb. 2004, 31 pages.

Patent Cooperation Treaty, "PCT Search Report and Written Opinion of the International Searching Authority" for Int'l Application No. PCT/US2007/070696, Feb. 25, 2008, 12 pages.

FINDbase LLC, "FINDbase(TM) Announces Powerful New Solution for Online Identity Authentication", http://news.thomasnet.com/fullstory/Software-provides-online-identity-authentication-460090, Feb. 3, 2005, 3 pages.

* cited by examiner

IDENTITY VERIFICATION USING LOCATION OVER TIME INFORMATION

BACKGROUND

In many forms of electronic transactions, it is necessary for a device to verify a user's identity. While humans are extremely good at identifying other humans through physical characteristics and behaviors, devices are not nearly as good. Devices typically rely on a user-name/password scheme. This is a good scheme in many ways, but it puts a significant burden on the user (e.g., having to remember and manage passwords for different accounts). Additionally, passwords are not truly suited for identification, as they can be easily shared. Shared passwords are almost impossible to detect, but they do not provide a true user identification to the level desired for many applications (e-commerce, user-based DRM, etc.). Physical tokens (e.g. keys) are also a good way to gain access, but they do not necessarily prove identity. Some newer laptop computers include fingerprint sensors to aid in determining whether the proper user is trying to access the system. Currently, most of the identity management mechanisms based on physical biometrics (e.g., fingerprint, voice, hand geometric, etc.) and behavioral biometrics (e.g., signature, keystroke pattern, etc.) require the user to perform some explicit action in order to establish and/or verify their identity. For example, a user must utter some predetermined phrase when a voice recognition system is used. However, in order to provide the user with a more seamless experience, a passive means of biometric verification capable of operating in the background is needed.

One approach to passive identification, for example, is the use of location at the time of access, in addition to a person's purchase behavior, as a means to detect identity fraud. This is the way credit card companies often monitor their customer's buying habits. Data about credit card users are often collected from the information submitted by the merchants as part of the payment approval process. The collected information is typically stored in some infrastructure and analyzed for unusual activities over a period of time (to detect fraud/theft). The above method utilized by credit card companies to deter identity fraud is not well suited to identity management use cases in the mobile environment, which typically involve user identification before a transaction. Furthermore, the remote collection of data on a user raises privacy concerns, as the user has no control over what data is collected and when.

A further approach uses time and location of access as part of its determination of access rules. However, this approach only uses the actual time/location of the log-in as part of the identity management and user authentication process.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
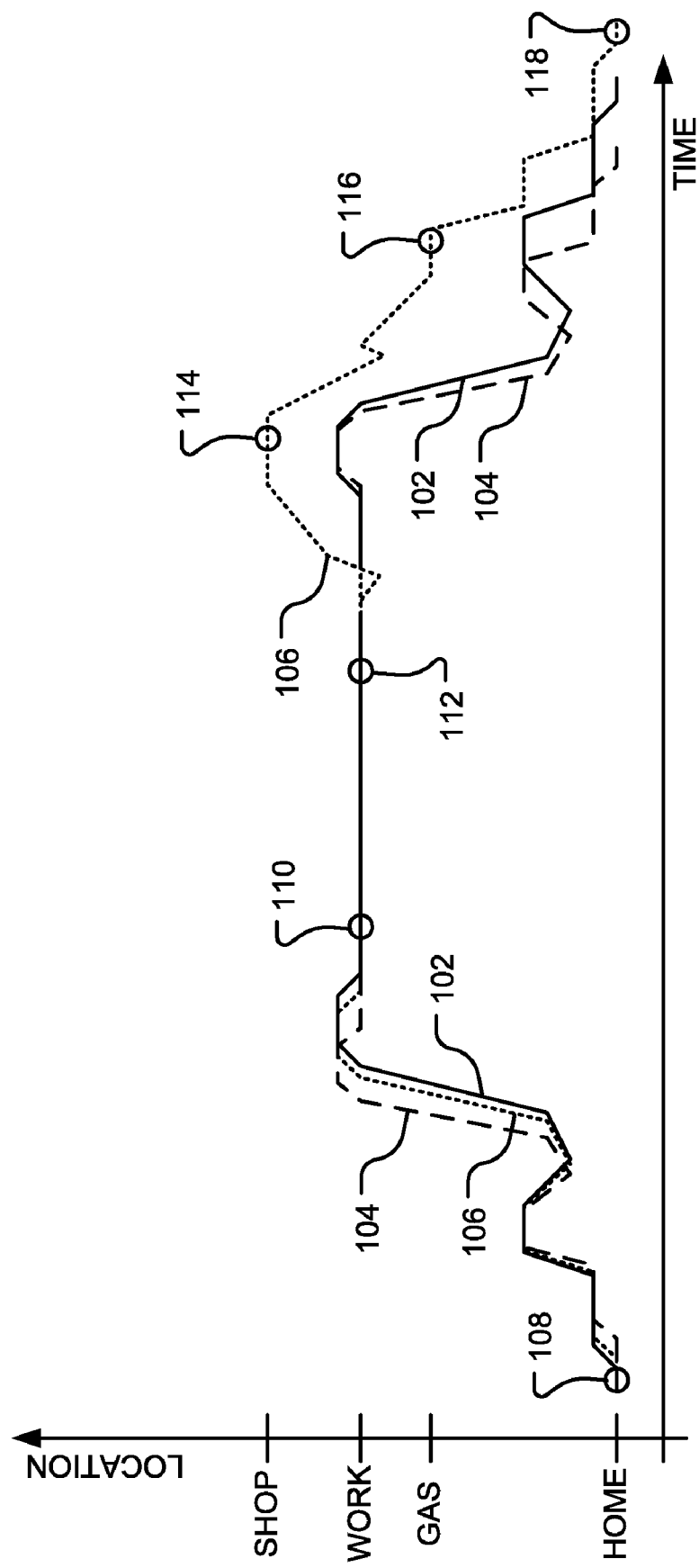
FIG. 1 is an exemplary plot showing location over time.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to identity verification using location over time information. Continual verification of a user's identity is facilitated by tracking the user's movements over time using a mobile device. It is recognized that there is a high degree of regularity in the location and timing aspects of the activities of individuals during their daily lives. For example, on a typical work day, an office worker starts from his house for work near a certain time in the morning, and travels a certain route, with small variations. Within some interval, he arrives at work at roughly the same time each day. Assuming no exceptional circumstances, he leaves the office for home in the evening, and gets there, at around the same time every day.

In addition to exhibiting only slight variations in their daily whereabouts, some combinations of locations visited are unique to an individual. For example, it is unlikely that two workers in the same office will reside in the same home. It is also unlikely that two family members share the same exact workplace.

Other aspects of a person's movement patterns, however, may not be so regular or unique. This can be seen in the event that a driver deviates from his normal route when he encounters a traffic jam. Thus, some timings and locations deserve more emphasis than others in the ongoing verification of a person's identity. To determine whether a user's identity has been maintained throughout some time interval (e.g., during the course of a day), the verification device would implement a scoring system which assigns more weight to critical locations such as a person's home and workplace. Consequently, an adversary must gain access to these locations, in addition to obtaining possession of the verification device, in order to defeat the system.

In one embodiment, a mobile device builds a higher level of confidence in its user's identity by tracking the user's movements over time. Thus, it can potentially eliminate the user's need to re-authenticate every time he requires access to valuable services or contents. Furthermore, the sensitive information on a user's whereabouts is collected and stored locally in the device. This helps to protect the user's privacy by providing him with control over what information is collected and when. It is also noted that it is unlikely that tracking location over time would be used as the sole means of user authentication. Tracking location over time may be used to supplement other authentication mechanisms.

The approach has application in any GPS-capable device that needs to authenticate the user. However, GPS is just one of many ways of determining location. Other possible means include, but not limited to, reverse RF triangulation (e.g., using E-OTD to locally calculate location on a mobile device) and contact with fixed, short-range wireless access points. Thus, the approach is applicable to any mobile device, such as a cellular telephone, a PDA, a portable email device, or a portable computer, that has cellular connectivity and/or proximity network capabilities (e.g., 802.11x, Bluetooth, etc.).

FIG. 1 is an exemplary plot showing location over time. In FIG. 1, a single location dimension is shown, but 2 or 3 dimensions of location may be monitored by the device. FIG. 1 shows three plots, 102, 104 and 106, corresponding to routes traversed over three consecutive days. For example, routes 102 and 104 originate at the user's home, move to the user's place of work, and then returns to the user's home. Route 106 shows a route that is a variation from the routine. This route returns from the user's work to the user's home via a shop and a gas station. Also shown in FIG. 1 are the locations and time of network access by the user. These are depicted by the circles 108, 110, 112, 114, 116 and 118. It is apparent that considerably more information is contained in the full route 106 than is contained in the access location alone. Consequently, location over time provides more reliable user verification information than access locations alone.

In FIG. 1, the routes 102 and 104 do not align exactly in time, because of variation in the user's schedule and traffic conditions, for example. However, established signal processing techniques known to those of ordinary skill in the art may be used to time-align the routes. Vector clustering or other techniques may be used to identify common routes. Pattern matching techniques may be used to compare a current route to the stored routes.

Higher importance may be given to route or sub-route end-points than to details of the route itself, since the user may vary the route. For example, the second half of route 106 in FIG. 1 begins at the user's work and ends at the user's home, even though the usual route is not taken. There is a high probability that it is the user that is making this trip, rather than someone who has gained unauthorized access to the user's device.

In general, features of the routes will be extracted from the route information. From these features, features that are deemed to be characteristic of the user are identified. For example, a characteristic feature may be a start or end location of a route, a particular sequence of locations, or a particular combination of locations and times. Home and work locations are highly characteristic of the user. A commonly visited gas station may also be characteristic, but would be assigned a lower weighting than the more personal locations.

Figure 2:
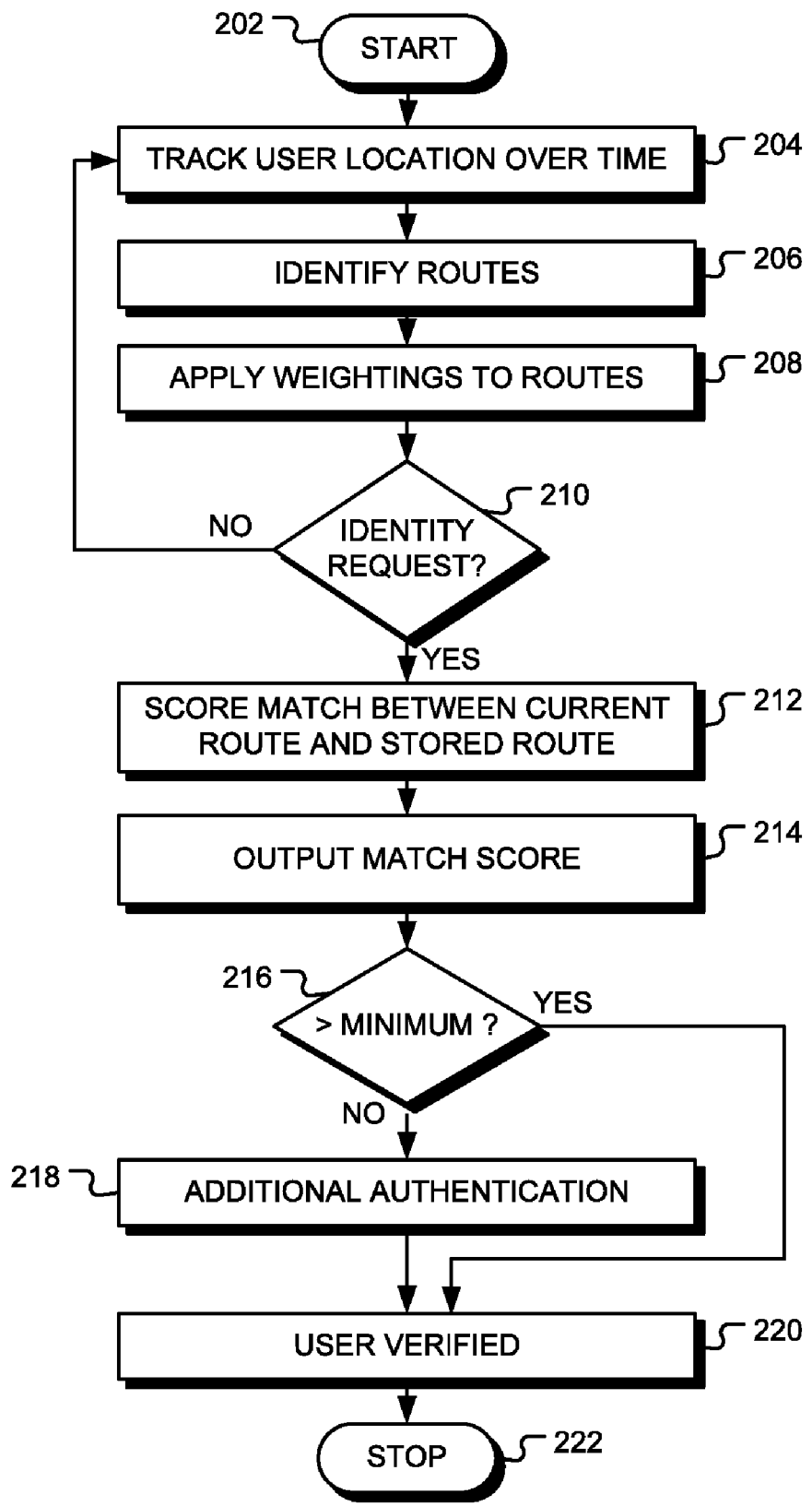
FIG. 2 is a flow chart of a method for user verification consistent with certain embodiments of the invention.

FIG. 2 is a flow chart of a method for user verification consistent with certain embodiments of the invention. Following start block 202 in FIG. 2, the location of a user's device is recorded over time, as depicted in block 204. This information is stored on the device to minimize privacy concerns. The information may be encrypted to prevent unauthorized access to the information should the device be lost or stolen. At block 206, the device identifies characteristic features of the routes traveled by the device. These may include the routes taken, the frequency and timing of those routes, the start and end positions of the routes, locations at which the user spends considerable time or locations the user visits often. At block 208, weightings are applied to the route characteristic features. These weightings may, for example, indicate a relative probability that it is the user who has traversed the route. Weightings may also indicate the variance or surety of the route/user match.

If the user requests an operation, such as a transaction or network access, that requires verification of the user's identity, as depicted by the positive branch from decision block 210, the degree of match between the most recent route (the user's location over recent time) and a stored route is quantified as a match score at block 212. For example, the most recent routine may be the route by which the user arrived at his current location. Recent time is then taken to be the period of time from when the user departed for the current location to the present time. The match score may be output at block 214 for use by other applications wishing to obtain identity information, some of which may put more or less trust in the user verification method utilizing location over time information. In one embodiment, flow continues to decision block 216. If no identity verification is requested, as depicted by the negative branch from decision block 210, the device continues to track location. At decision block 216, the match score of the most recent route is checked to see if this route is commonly used by the user. If the match score is above a prescribed threshold for the operation being requested, as determined by the positive branch from decision block 216, the user's identity is verified and the operation may proceed. Otherwise, as depicted by the negative branch from decision block 216, the user is prompted for additional information at block 218. If the additional information is sufficient to authenticate the user, the user's identity is verified at block 220 and the operation may proceed.

If a new route is detected, operation of the mobile device may be limited until the user's identity can be verified by another method.

The user may be prompted (once per day, for example) to enter a password, or equivalent, to enable updating of location tracking. This prevents the device from adapting to the routes of an unauthorized user.

The user may also enter location and time information to the mobile device, after being authenticated by the device. For example, the user may enter home and work locations together with corresponding time information. The user may also pre-enter information about a location to be visited. Similarly, the user may select from travel information that was previously collected by the mobile device.

Figure 3:
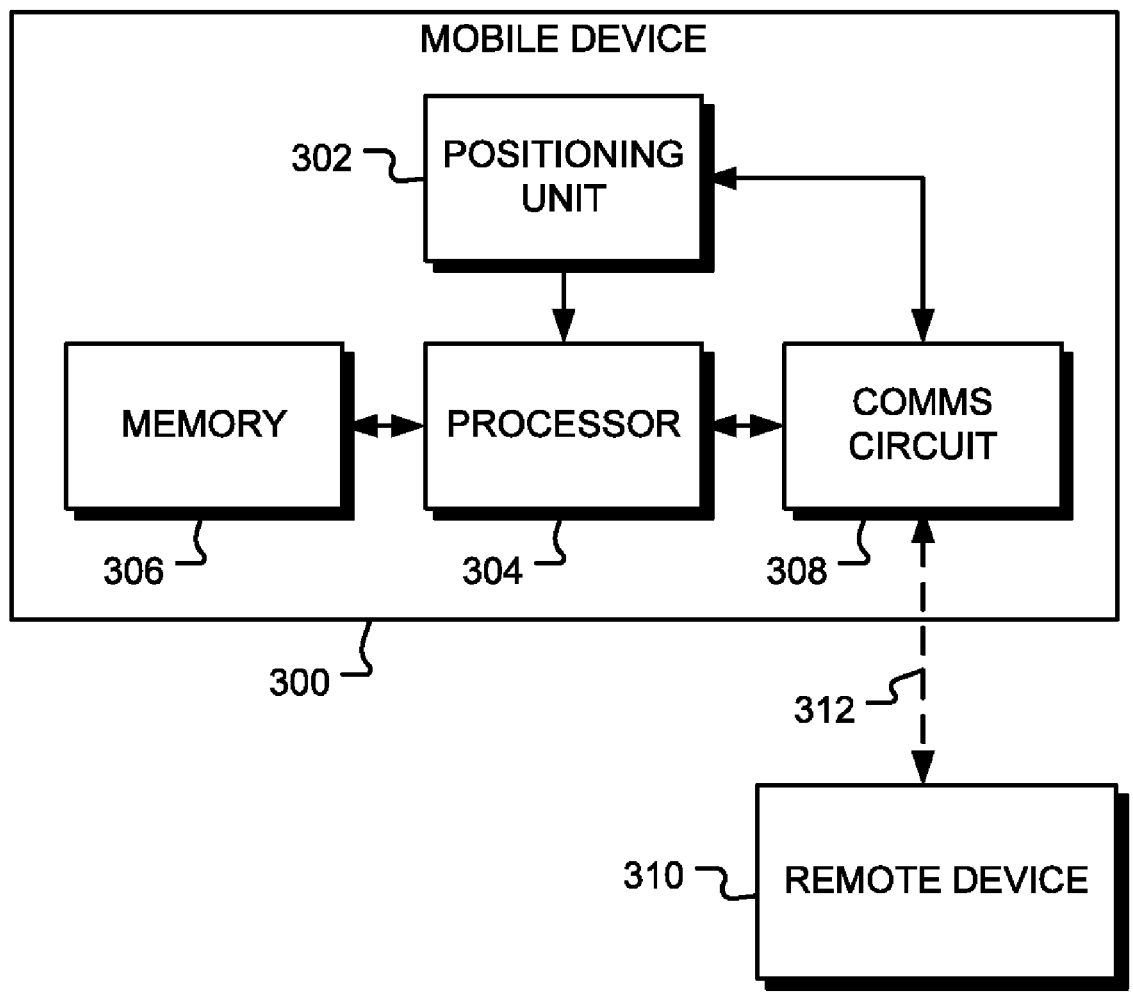
FIG. 3 is a block diagram of a system for user verification consistent with certain embodiments of the invention.

FIG. 3 is a block diagram of a system operable to perform user identity verification using location over time information. The mobile device 300 includes a positioning unit 302 for identifying the location of the mobile device over time to obtain a current route and a number of previous routes. The mobile device 300 also includes a processor 304 that is operable to identify characteristic features of the previous routes. These characteristic features are stored in a memory 306 in the device. When user identity verification is required, the processor compares one or more features of the current route to the characteristic features of previous routes. The identity is verified if the one or more features of the current route match with characteristic features of the previous routes. The positioning unit may be, for example, a Global Positioning System (GPS) or a radio frequency positioning unit that determines distances to fixed access points and uses triangulation to determine the location of the mobile device.

The mobile device may also include a communication circuit 308 to allow access to a remote device 310 using a wireless or wired communication link 312. The processor 304 is operable to verify the identity of a user when access to the remote device 310 is desired.

The characteristic features of the previous routes may be stored on the mobile device or on a remote device that is accessible to the mobile device. The remote device may be, for example, a user's home computer.

The present invention, as described in embodiments herein, is implemented using a programmed processor of a mobile device, executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations, such as verification using additional techniques, can be added or operations can be deleted without departing from the invention. Such variations are contemplated and considered equivalent.

The mobile device may be, for example, a cellular telephone, personal digital assistant, pager, portable computer, two-way radio, or a device in an automobile or other vehicle.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for verifying the identity of a user of a mobile device, the method comprising:
    determining, by the mobile device, the location of the mobile device over recent time to obtain a current route;
    comparing, by the mobile device, a feature of the current route to characteristic features of previous routes; and
    verifying, by the mobile device, the user if the feature of the current route matches a characteristic feature of the previous routes; and
    prompting, by the mobile device, the user to enter authentication information to enable storing of routes if the feature of the current route does not match a characteristic feature of the previous routes.

2. A method in accordance with claim 1, further comprising:
    acquiring the location of the mobile device over time to obtain a plurality of routes;
    identifying characteristic features of the plurality of routes; and
    storing the characteristic features of the plurality of routes.

3. A method in accordance with claim 2, further comprising assigning weightings to the characteristic features.

4. A method in accordance with claim 1, wherein determining the location of the mobile device over time comprises recording location coordinates and times.

5. A method in accordance with claim 1, further comprising:
    receiving, by the mobile device, location and time information from the user.

6. A method in accordance with claim 1, further comprising:
    limiting operation of the mobile device if a new route is detected, until the user's identity is verified by another method.

7. A method in accordance with claim 1, wherein the characteristic features of previous routes are stored on the mobile device.

8. A method in accordance with claim 1, wherein the characteristic features include a start position, an end position, locations at which the user spent more than a predetermined amount of time, and locations visited by the user more than a predetermined number of times.

9. A method in accordance with claim 1, wherein the prompting occurs at regular time intervals.

10. A mobile device comprising:
    a positioning unit for identifying the location of the mobile device at a plurality of times to obtain a current route and a plurality of previous routes;
    a processor operable to receive routes from the positioning unit, to identify characteristic features of the plurality of previous routes, and to identify a feature of the current route; and
    a memory, coupled to the processor and operable to store the characteristic features of the plurality of previous routes,
    wherein the processor is further operable to compare the feature of the current route with the characteristic features of the plurality of previous routes and verify the identity of the user if the feature of the current route matches a characteristic feature of the plurality of previous routes; and
    to prompt a user of the mobile device to enter authentication information to enable storing of routes if the feature of the current route does not match a characteristic feature of the plurality of previous routes.

11. A mobile device in accordance with claim 10, wherein the positioning unit comprises a Global Positioning System (GPS).

12. A mobile device in accordance with claim 10, wherein the positioning unit comprises a radio frequency positioning unit.

13. A mobile device in accordance with claim 10, further comprising a wireless communication circuit operable to access a remote device associated with the user, wherein the processor is operable to verify the identity of a user prior to the wireless communication circuit attempting to access the remote device.

14. A mobile device in accordance with claim 10, wherein the characteristic features include a start position, an end position, locations at which the user spent more than a predetermined amount of time, and locations visited by the user more than a predetermined number of times.

15. A mobile device in accordance with claim 10, wherein the processor is further operable to prompt the user at regular time intervals.

16. A mobile device operable to verify the identity of a user of the mobile device, the mobile device comprising:
    a means for determining the location of the mobile device over recent time to obtain a current route; and
    a means for comparing a feature of the current route to characteristic features of previous routes stored on the mobile device and for verifying the identity of the user if the feature of the current route matches a characteristic feature of previous routes; and
    a means for prompting the user to enter authentication information to enable storing of routes if the feature of the current route does not match a characteristic feature of the previous routes.

17. A mobile device in accordance with claim 16, further comprising:
    a means for acquiring the location of the mobile device over time to obtain a plurality of routes;
    a means for identifying characteristic features of the plurality of routes; and
    a memory means for storing the characteristic features of the plurality of routes in the mobile device.

18. A mobile device in accordance with claim 17, further comprising an interface means for enabling the user to activate and deactivate the means for tracking the location of the mobile device over time.

19. A mobile device in accordance with claim 16, wherein the characteristic features include a start position, an end position, locations at which the user spent more than a predetermined amount of time, and locations visited by the user more than a predetermined number of times.

20. A mobile device in accordance with claim 16, wherein the prompting occurs at regular time intervals.

* * * * *